S. L. HARDMAN.
CASTER.
APPLICATION FILED JULY 21, 1919.

1,420,190.

Patented June 20, 1922.

Inventor
Semion Leroy Hardman
by
his Attorney

UNITED STATES PATENT OFFICE.

SEMION LEROY HARDMAN, OF OCEAN PARK, CALIFORNIA.

CASTER.

1,420,190. Specification of Letters Patent. Patented June 20, 1922.

Application filed July 21, 1919. Serial No. 312,236.

*To all whom it may concern:*

Be it known that I, SEMION LEROY HARDMAN, a citizen of the United States, residing at Ocean Park, in the county of Los Angeles, State of California, have invented new and useful Improvements in Casters, of which the following is a specification.

This invention relates to casters to be used in connection with furniture and the like, and it is an object of the invention to provide a simple caster that will not scratch or mar a floor or surface over which it is rolled.

It is a particular object of the invention to provide a simple ordinary sized caster the roller of which has a comparatively soft tread or rim. The rim of the roller being soft allows the caster to be rolled over polished or finished surfaces without marring or injuring them in any way. The rim is preferably made of a fairly soft somewhat resilient material which will not leave a streak or dull mark on a polished surface such as rubber leaves when it engages such a surface. The caster is provided with means for keeping it lubricated which, in combination with the soft tread, makes it roll easily and silently.

A further feature is the construction of the caster which makes it possible to easily replace the rim of the roller when it becomes worn. By thus being able to repair a worn caster the expense of replacing the entire caster, when it becomes a little worn, is saved.

Further features of the invention will be readily understood from the following detailed description of a preferred form of the invention, in which reference is had to the accompanying drawings, in which—

Figure 1:
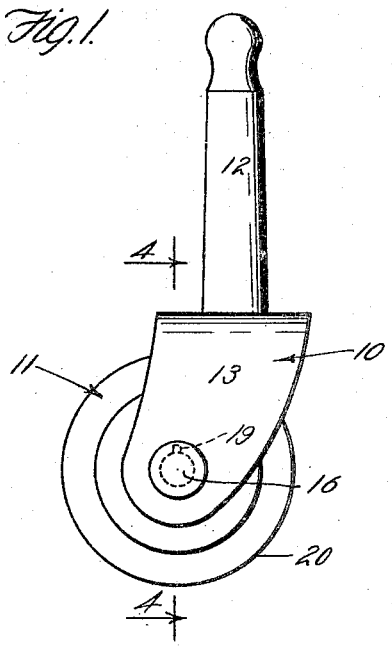
Figure 2:
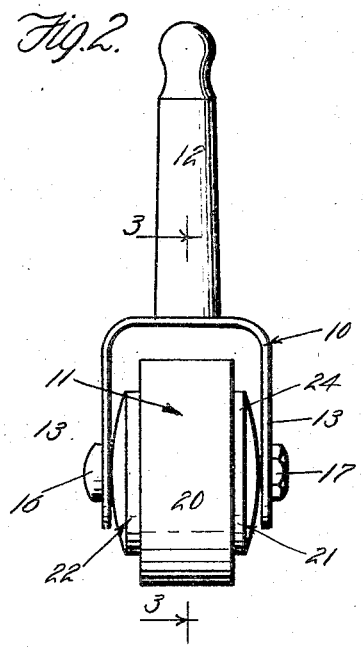
Figure 3:
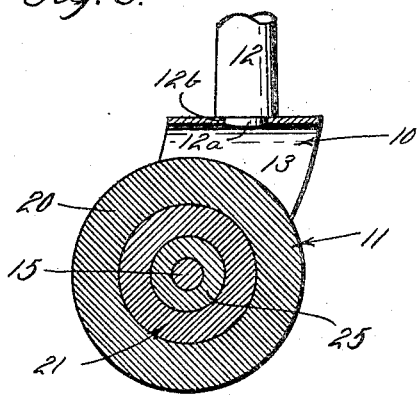
Figure 4:
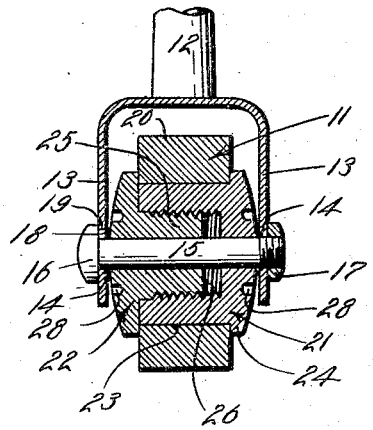
Figure 5:
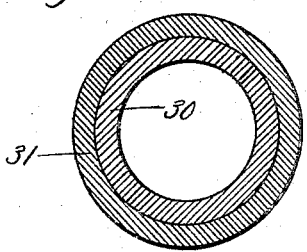

Fig. 1 is a side view of the caster; Fig. 2 is a front view of the caster; Fig. 3 is a detail section taken as indicated by line 3—3 on Fig. 2; Fig. 4 is a detail section taken as indicated by line 4—4 on Fig. 1; and Fig. 5 is a section through a modified form of rim construction which may be used in connection with the caster.

In the drawings numeral 10 designates the body of the caster which forms a yoke in which is carried the wheel or roller 11. Extending from the body 10 there is a pin 12 which forms a pivot by which the caster may be mounted on or connected to a piece of furniture or the like. The pin 12 is mounted on or connected to the body 10 by means of a portion 12ª which extends through a hole 12ᵇ in the body and is riveted over as shown in Fig. 3. Although various forms of mounting means may be used in connection with the caster it is preferred that the pivot pin 12 shown in the drawings be used for this purpose. The pivot pin 12 is preferably round in cross section and is mounted in such a manner as to allow the caster to swing or turn around it as a center. The pivot pin 12 is so arranged in relation to the roller 11 that the body of the caster will turn or swing so that the roller will drag behind the pivot regardless of the direction in which the furniture is moved.

In the arms 13 of the yoke formed by the body 10 there are holes 14. Carried in the holes 14 and extending between the arms 13 of the body 10 there is a shaft 15. The shaft 15 is provided with a head 16 on one end and has a nut 17 screw threadedly engaged on the other end, said nut and head being provided to hold the shaft in place in the yoke. Extending inwardly from the head 16 there is a projection 18 which engages a notch 19 in one of the arms 13. This engagement of the projection 18 in the notch 19 prevents rotation, or movement of the shaft 15 when the nut 17 is being turned. The head 16 and also the nut 17 are preferably made comparatively thin and are rounded so that they do not project from the body so as to be in the way or be unsightly.

The wheel or roller 11 is carried on the shaft 15 between the arms 13 of the yoke. The roller 11 preferably comprises a metallic hub and a comparatively soft somewhat resilient rim. By a soft rim is meant a rim which is firm enough to keep its shape, at the same time being pliable or yielding enough that it may be rolled or slid over a material such as wood without scratching, marring or cutting it. A non-abrasive material which has sufficient body to withstand considerable pressure and is sufficiently resilient to resume its original form after it has been somewhat pressed out of shape is the kind of material that is adapted for this purpose. Although there are many materials that could be used satisfactorily it is preferred that felt be used as it possesses the desired characteristics and is inexpensive. Felt is preferred over rubber as it may be rubbed or rolled over a polished surface without leaving a streak or mark of any kind.

The hub comprises two portions 21 and 22. The portion 21 has a cylindrical sleeve 23 on which is carried the tread or rim 20. At one end of the portion 21 there is an enlarged portion or flange 24 against which one side of the tread 20 abuts. The portion 22 forms a flange which engages the other side of the tread 20 and has a projection 25 which is screw threadedly engaged in a recess 26 in the portion 21. The tread 20 is preferably made a little wider than the sleeve 23 of the portion 21 so that when portion 22 is screwed tightly into portion 21 the tread 20 is somewhat compressed. This compression of tread 20 causes its inner periphery to contract somewhat and thereby firmly grip sleeve 23. This gripping of the sleeve 23 by the tread 20 prevents moving or slipping of the tread on the hub thereby causing all the wear, due to rotation, to come between the hub 22 and the shaft 15. If it is so desired, sufficient space may be left, between the bottom of the recess 26 and the end of the projection 25, to allow some hard grease or a wick soaked with oil to be placed in the recess when the caster is assembled and thereby cause the caster to be lubricated for a considerable length of time.

If the caster is to be used on heavy furniture or if it is desired to make the caster particularly strong and solid a rim of the type in Fig. 5 may be used in preference to that which has been described. This form of rim comprises two portions, an inner firm portion 30 and an outer relatively soft portion 31. The inner portion 30 is preferably made of fibre or the like while the outer portion is of felt or the like. This form of rim construction makes the caster practically as unyielding as a solid metal caster at the same time giving it a soft tread which will not scratch, mar or injure a floor or the like in any way.

In the outer end of the portion 21 and also in the outer end of the portion 22 there are holes 28. The holes 28 are comparatively small and are not very deep as they are merely to provide a means by which the portions 21 and 22 may be gripped by spanner wrenches in order to screw them together or take them apart.

Having described a preferred form of the invention, I do not wish to limit myself to the details hereinabove set forth but wish to reserve to myself any changes or modifications which may appear to those skilled in the art or fall within the scope of the following claims.

Having described a preferred form of the invention, I claim:

1. A caster roller embodying two disks having axial bores to receive a shaft, an internally screw threaded sleeve projecting from one face of one of said disks, its inner diameter being larger than the axial bore and its outer diameter smaller than the diameter of the disk; an externally screw threaded projection extending from one face of the other disk of a diameter to screw threadedly engage in said sleeve, the axial bore extending through this projection, a ring of soft material forming a tread rim encircling the periphery of said sleeve and held thereon by said disks; the said projection being shorter in length than the said sleeve to form an oil chamber around the shaft when the two are in screw-threaded engagement.

2. A caster roller comprising two opposed disks having axial bores to receive a shaft, an internally screw-threaded sleeve projecting from one face of one of said disks concentric with said bore, its inner diameter being larger than said axial bore and its outer diameter smaller than the diameter of the disk; an externally screw-threaded projection extending from one face of the other disk of a diameter to screw-threadedly engage in said sleeve, the axial bore extending through this projection and concentric therewith; a tread of soft material encircling the periphery of said sleeve and held thereon by said disks; the said projection being shorter in length than said sleeve to form an oil chamber around the shaft when the two are in screw threaded engagement.

In witness that I claim the foregoing I have hereunto subscribed my name this 15th day of July, 1919.

SEMION LEROY HARDMAN.

Witness:
   VIRGINIA I. BERINGER.